United States Patent
Levine

(10) Patent No.: US 8,141,053 B2
(45) Date of Patent: Mar. 20, 2012

(54) CALL STACK SAMPLING USING A VIRTUAL MACHINE

(75) Inventor: Frank Eliot Levine, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1112 days.

(21) Appl. No.: 11/969,439

(22) Filed: Jan. 4, 2008

(65) Prior Publication Data

US 2009/0178036 A1    Jul. 9, 2009

(51) Int. Cl.
*G06F 9/44* (2006.01)
(52) U.S. Cl. .................. 717/127; 717/128; 717/130
(58) Field of Classification Search .................. None
See application file for complete search history.

(56) References Cited

U.S. PATENT DOCUMENTS

| | | | | |
|---|---|---|---|---|
| 4,414,624 | A | * | 11/1983 | Summer et al. ............ 712/21 |
| 5,995,754 | A | | 11/1999 | Holzle et al. |
| 6,728,949 | B1 | * | 4/2004 | Bryant et al. .............. 717/127 |
| 6,857,120 | B1 | | 2/2005 | Arnold et al. |
| 7,103,876 | B1 | | 9/2006 | Lopez et al. |
| 2004/0064676 | A1 | * | 4/2004 | Burugula et al. ........... 712/30 |

OTHER PUBLICATIONS

U.S. Appl. No. 11/834,779, filed Aug. 7, 2007, Kuiper et al.

* cited by examiner

*Primary Examiner* — Jennifer To
*Assistant Examiner* — Louis Diep
(74) *Attorney, Agent, or Firm* — Yee & Associates, P.C.; David A. Mims, Jr.

(57) ABSTRACT

Call stack information is sampled. A flag associated with a target thread is set in a memory work area associated with a virtual machine in response to an interrupt. Monitoring for an event takes place during execution of a plurality of threads created by the virtual machine. A determination is made as to whether the flag is set in response to an occurrence of the event. If the flag is set, the virtual machine makes a call out to a profiler which initiates sampling of the call stack information in response to the flag being set.

17 Claims, 5 Drawing Sheets

CALL STACK SAMPLING USING A VIRTUAL MACHINE

BACKGROUND OF THE INVENTION

1. Field of the Invention

The present invention relates generally to an improved data processing system and in particular to a method and apparatus for processing data. Still more particularly, the present invention relates to a computer implemented method, apparatus, and computer usable program code for call stack sampling in a data processing system.

2. Description of the Related Art

In writing code, runtime analysis of the code is often performed as part of an optimization process. Runtime analysis is used to understand the behavior of components or modules within the code using data collected during the execution of the code. The analysis of the data collected may provide insight to various potential misbehaviors in the code. For example, an understanding of execution paths, code coverage, memory utilization, memory errors and memory leaks in native applications, performance bottlenecks, and threading problems are examples of aspects that may be identified through analyzing the code during execution.

The performance characteristics of code may be identified using a software performance analysis tool. The identification of the different characteristics may be based on a trace facility of a trace system. A trace tool may be used using various techniques to provide information, such as execution flows as well as other aspects of an executing program. A trace may contain data about the execution of code. For example, a trace may contain trace records about events generated during the execution of the code. A trace also may include information, such as a process identifier, a thread identifier, and a program counter. Information in the trace may vary depending on the particular profile or analysis that is to be performed. A record is a unit of information relating to an event that is detected during the execution of the code.

Attempting to obtain an unbiased time based sample call stack from a virtual machine, such as a Java™ virtual machine, on an operating system may be a difficult task. Java™ is a trademark of Sun Microsystems, Inc. Many approaches are presently used for obtaining call stack information. These approaches include using entry/exit events, an application timer tick, or instrumenting code to sample the instrumented values.

These types of techniques, however, in a symmetric multiprocessor (SMP) system, have a drawback of requiring additional instrumentation in the code or possibly allowing the thread whose call stack is to be sampled to migrate to a different processor during the sampling process. Obtaining call stacks for large applications may cause a significant performance degradation to the application being profiled. Using entry and exit events for each method and processing may range from two to twenty times the normal processing overhead for larger applications.

The approach of using a timer tick to sample or obtain call stack information by signaling a sampling thread that obtains the call stack may produce desirable results with less system perturbation. To obtain and return a call stack, a Java™ virtual machine shifts into a safe state. In order to shift into this safe state, the Java™ virtual machine may obtain a lock and affect normal processing. Other issues can occur with this type of sampling. For example, when the call stack is requested, the thread that has been interrupted may migrate to a different processor. Migration of the thread from one processor to another processor may result in reports that are biased. Further, additional idle time may occur with the Java™ virtual machine moving into a safe state.

Therefore, it would be advantageous to have a computer implemented method, apparatus, and computer usable program code that overcome some or all of the problems described above as well as possibly other problems.

SUMMARY OF THE INVENTION

The illustrative embodiments provide a computer implemented method, apparatus, and computer usable program code for sampling call stack information. A flag associated with a target thread is set in a memory work area associated with a virtual machine in response to an interrupt. An event is monitored for during execution of a plurality of threads created by the virtual machine. A determination is made as to whether the flag is set in response to an occurrence of the event. If the flag is set, the virtual machine makes a call out to a profiler which initiates sampling of the call stack information in response to receiving the call out.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
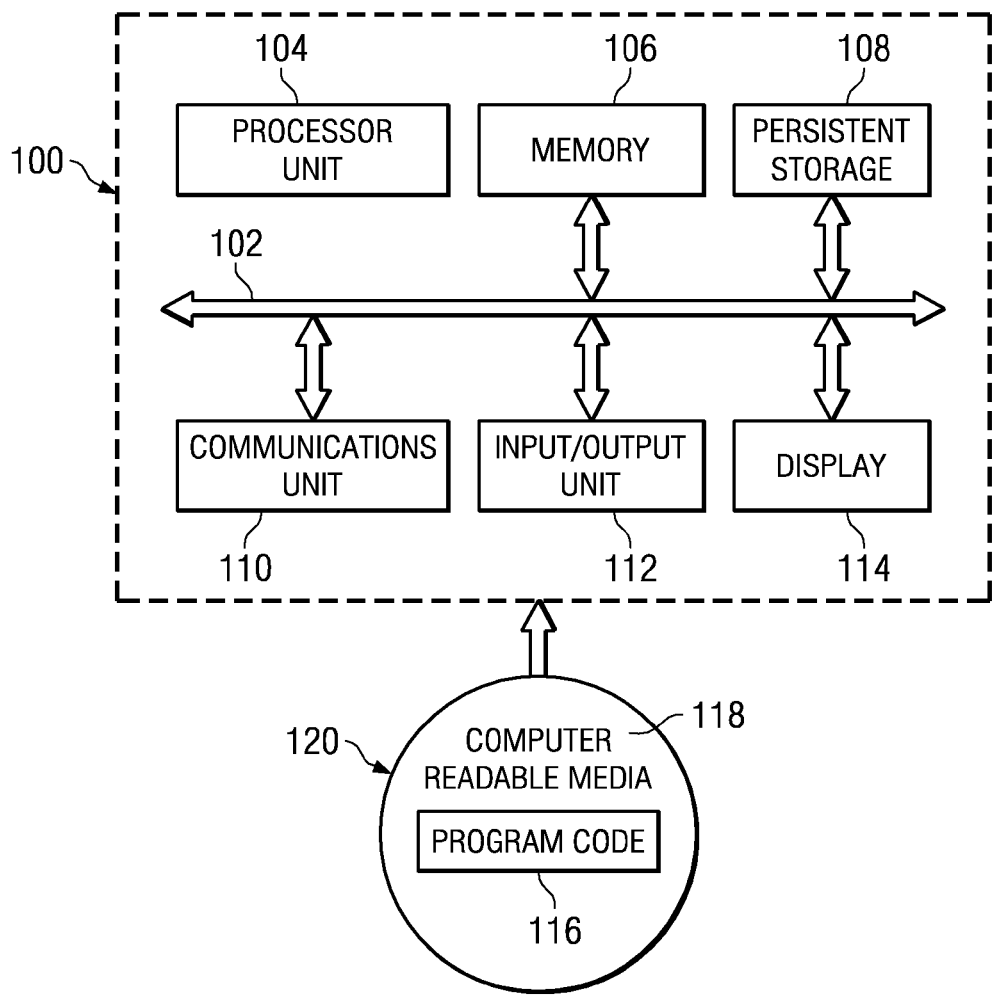
FIG. 1 is a diagram of a data processing system in accordance with an illustrative embodiment.

With reference now to the figures and in particular with reference to FIG. 1, a diagram of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 that is selectively removable and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive, a thumb drive, or a flash memory that is connected to data processing system 100. The tangible form of computer readable media 118 is also referred to as computer recordable storage media. In some instances, computer readable media 118 may not be removable.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

As one example, a storage device in data processing system 100 is any hardware apparatus that may store data. Memory 106, persistent storage 108 and computer readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

The different advantageous embodiments provide a computer implemented method, apparatus, and computer usable program code that obtains call stack information. A flag associated with a target thread in a memory area associated with a virtual machine is set in response to an interrupt. Monitoring is performed for an event during execution of threads created by the virtual machine. In response to an occurrence of an event, a determination is made as to whether the flag is set. Responsive to the flag being set, a call out is made to a profiler to initiate sampling of the call stack information.

In the different illustrative embodiments, a call back function or internal support for checking a thread flag in a virtual machine, such as a Java™ virtual machine, is used to determine whether to initiate the collection of call stack information. In these examples, a flag monitored by the virtual machine is checked at various events. In these examples, the events include entering into a method, exiting from a method, and backward branches. Of course, other events also may be used depending on the different embodiments. For example, forward branches also may be used in addition to or in place of the other examples. When the flag is set, the virtual machine calls a profiler to indicate that a particular event has occurred. In response, the profiler calls the virtual machine to obtain call stack information in these examples.

Figure 2:
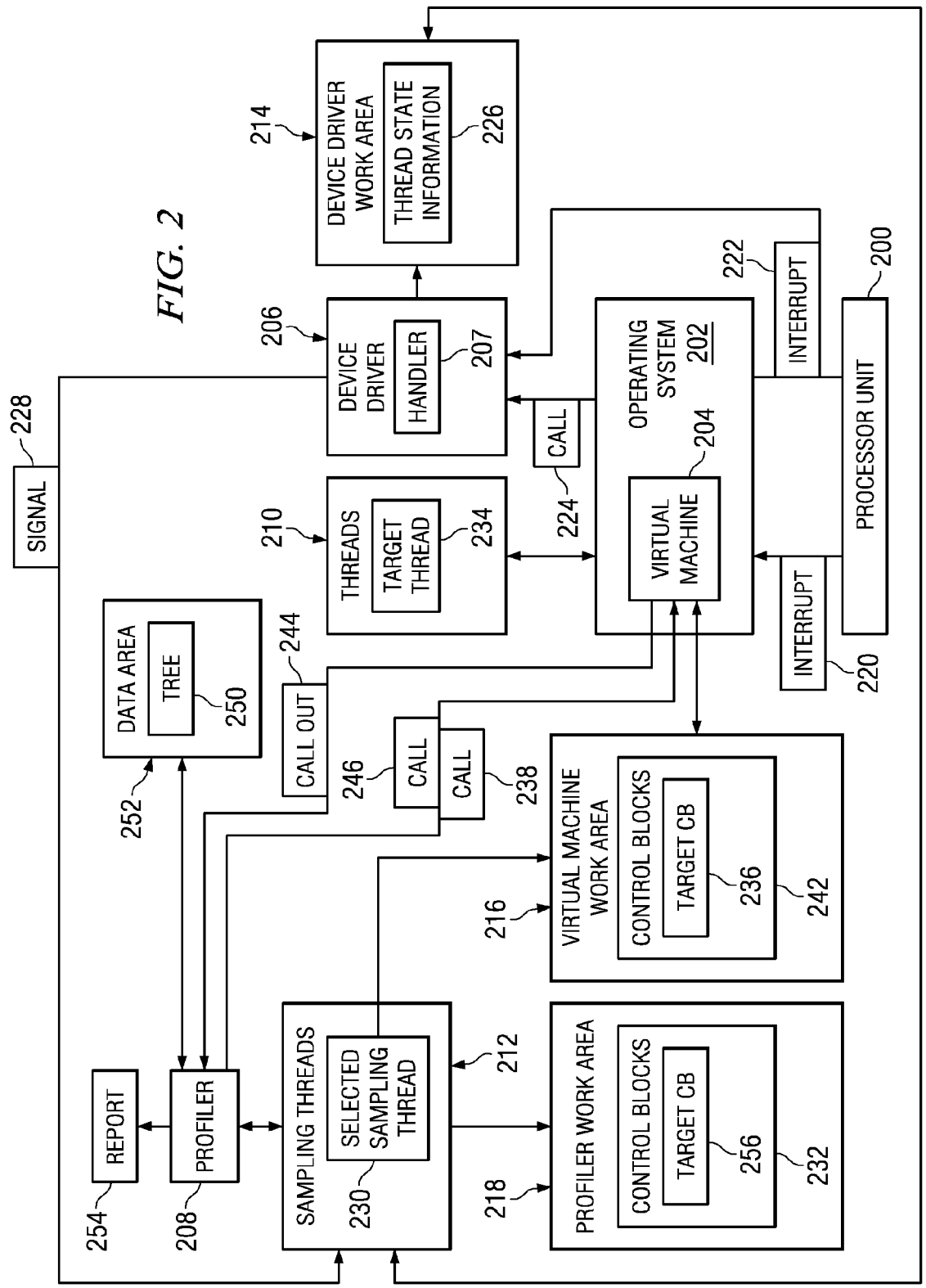
FIG. 2 is a diagram illustrating components used to obtain call stack information in accordance with an illustrative embodiment.

With reference now to FIG. 2, a diagram illustrating components used to obtain call stack information is depicted in accordance with an illustrative embodiment. In this depicted example, the components are examples of hardware and software components found in the data processing system, such as data processing system 100 in FIG. 1. These components include processor unit 200, operating system 202, virtual machine 204, device driver 206, handler 207, profiler 208, threads 210, sampling threads 212, device driver work area 214, virtual machine work area 216, and profiler work area 218.

Processor unit 200 is similar to processor unit 104 in FIG. 1 and may generate interrupts, such as interrupts 220 and 222 from a set of processors within processor unit 200. A set, in these examples, refers to one or more items. For example, a set of processors is one or more processors.

These interrupts may be, for example, without limitation, timer interrupts or counter overflow interrupts. A performance counter overflow interrupt may occur for any programmed event, such as, when a number of cache misses have occurred. The interrupts may be passed to device driver 206 in a number of different ways. For example, interrupt 220 is passed to device driver 206 through call 224. Interrupt 222 is passed directly to device driver 206. After receiving this interrupt, device driver 206 may process the interrupt using a deferred procedure call (DPC) to handler 207 located within device driver 206. Of course, other routines or processes may be used to process these interrupts. The deferred procedure call initiated by device driver 206 is used to continue processing interrupt information from interrupt 222.

If device driver 206 determines that a sample should be taken based on call 224 or the processing of interrupt 222, device driver 206 places thread state information 226 into device driver work area 214 in these examples. This information may include, for example, the thread identifier of the thread whose call stack is to be sampled. Device driver 206 also may save thread state information 226 into device driver work area 214. In these examples, thread state information 226 includes information about the target thread or thread identified in response to processing an interrupt. This thread state information may include, for example, a process identifier, a thread identifier, a stack pointer, and an application instruction address.

In addition, device driver 206 may send signal 228 to a sampling thread, such as selected sampling thread 230 within sampling threads 212. Signal 228 wakes selected sampling thread 230 to process the sample. In response to receiving signal 228, selected sampling thread 230 may copy thread state information for target thread 234 from thread state information 226 in device driver work area 214 into target control block (CB) 256 in control blocks 232 within profiler work area 218. Sampling threads 212 are part of or associated with profiler 208 in these examples.

Selected sampling thread 230 checks control blocks 232 for a particular control block associated with target thread 234. A control block is present within control blocks 232 for each thread in threads 210 that is initiated or created by virtual machine 204. In these examples, signal 228 includes an identifier of target thread 234.

In this example, target control block (CB) 236 is a control block associated with target thread 234. A determination is made as to whether a flag is set within target control block 236. This flag is used to determine whether sampling is in process or active for the target thread. In other words, this flag is used to determine whether a request or call has already been made to obtain call stack information for target thread 234. If the flag is set, then a count is incremented.

If the flag is not set within target control block 236, sampling for the thread is not active or in process. In this instance, profiler 208 makes a call, such as call 238 to virtual machine 204 to set a flag in target control block 236 within control blocks 242 in virtual machine work area 216. Control blocks 242 contain a control block for each thread within threads 210 created by virtual machine 204. Target control block 236 is a target control block corresponding to target thread 234 in these examples.

In the depicted examples, virtual machine 204 does not perform call stack information retrieval as soon as selected sampling thread 230 decides that call stack information for a particular thread should be retrieved. Instead, virtual machine 204 sets a flag in target control block 236, which is later used, to indicate to profiler 208 when virtual machine 204 is ready to obtain call stack information.

As different events occur, virtual machine 204 checks control blocks 242 to determine whether flags are set for any of the threads. In these examples, virtual machine 204 is a Java™ virtual machine. Of course, depending on the particular implementation, any type of virtual machine may be used for virtual machine 204. In these examples, the events include entry, exit, and backward branching events.

If a flag is set in a control block within control blocks 242, virtual machine 204 makes call out 244 to profiler 208. Call out 244 is a call made by virtual machine 204 to profiler 208 to indicate that call stack information can be retrieved.

In response, profiler 208 makes call 246 to virtual machine 204 to obtain call stack information for target thread 234 in these examples. When this call stack information is obtained, profiler 208 may process the information to create tree 250 in data area 252, which is allocated and maintained by profiler 208.

Tree 250 contains call stack information and also may include additional information about leaf node, which at the time of the sample is the current routine being executed. Profiler 208 may use tree 250 to generate report 254 based on call stack information collected over some period of time. In these examples, the different calls and signals may take various forms.

For example, a call or a signal may be as simple as a logic value made to an appropriate interface or component. In other embodiments, a call, call out, or some other suitable signal may include identification information as well as other data that may be useful in processing the call. The different work areas illustrated in these examples are sections of memory or other storage set aside for use by the different components.

Figure 3:
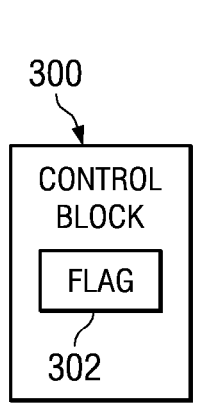
FIG. 3 is a diagram of a control block in a virtual machine work area in accordance with an illustrative embodiment.

Turning now to FIG. 3, a diagram of a control block in a virtual machine work area is depicted in accordance with an illustrative embodiment. In this example, control block 300 is an example of a control block that may be found within control blocks 242 in virtual machine work area 216 in FIG. 2.

Figure 4:
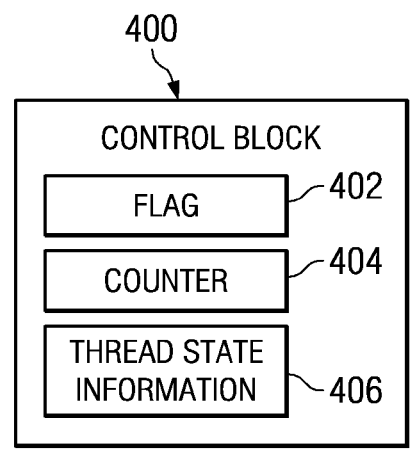
FIG. 4 is a diagram of a control block in a profiler work area in accordance with an illustrative embodiment.

Control block 300 includes flag 302. A control block, such as control block 300, is created for each thread that is created by a virtual machine. Flag 302 indicates whether a call out is to be made to a profiler to indicate that sampling may or should occur. Flag 302 is set in response to a request from the profiler to receive indication of when sampling may occur for a particular target thread. In these examples, flag 302 is reset by the virtual machine when the virtual machine makes a call out to the profiler. Control block 300 may include other data specific to the thread such as an indication of the byte code currently being executed or the native routine being executed Turning next to FIG. 4, a diagram of a control block in a profiler work area is depicted in accordance with an illustrative embodiment. In this example, control block 400 is an example of a control block that may be found within control blocks 232 in profiler work area 218 in FIG. 2.

In this example, control block 400 includes flag 402, counter 404, and thread state information 406. A control block, such as control block 400 is created by a profiler to contain information for use by sampling thread to process a sample. The profiler may create control blocks by processing thread creation events, or the profiler may create these control blocks at the time a target thread is to be sampled for the first time.

Flag 402 indicates whether a request has already been made for notification of when sampling of call stack information for a target thread may occur. In other words, flag 402 indicates whether sampling is already active for the particular target thread. Counter 404, in these examples, is used to identify a number of times that a sampling thread has been signaled to sample a target thread when a request for a notification has already been made.

In some embodiments, counter 404 also may serve the purpose of flag 402. For example, if counter 404 is zero, then a flag is unset for control block 400. If counter 404 has a value of one or more, then the flag is set for control block 400.

Flag 402 and counter 404 are reset when the processing of call stack information retrieved from a Java™ virtual machine completes in these depicted examples. The value of counter 404 may be used for generating statistics for the sampling. For example, a base count may be incremented with extra samples in a tree, such as tree 250 in FIG. 2.

Thread state information 406 is an example of information from thread state information 226 in device driver work area 214 in FIG. 2. This information is retrieved from this work area and stored within control block 400 for use in processing information about the target thread. Thread state information 406 is copied into control block 400 when a sampling thread is initiated to sample a particular target thread. In these examples, flag 402 and counter 404 are reset by the profiler when processing of the call stack information completes.

The use of flag 402 reduces the number of times a profiler may make a call to the virtual machine to set the flag within the virtual machine. By reducing the number of times a call may be made, overhead or the use of processing resources is reduced. For example, to make a call interface to a virtual machine takes a number of instructions without any value being added to set the same flag. No value is added to set the same flag when processing has not occurred to reset the flag.

By setting the same flag multiple times, additional overhead occurs. This overhead includes, for example, the native calling overhead between the profiler and the virtual machine and may include, for example, the virtual machine obtaining a lock or using a semaphore or an atomic instruction to set the flag. Obtaining the lock, if necessary, is expensive in contrast to simply incrementing a counter, such as counter 404. Of course, in some embodiments, rather than using the flag, such as flag 402, flag 302 in FIG. 3 may be set each time a sampling thread is woken.

Figure 5:
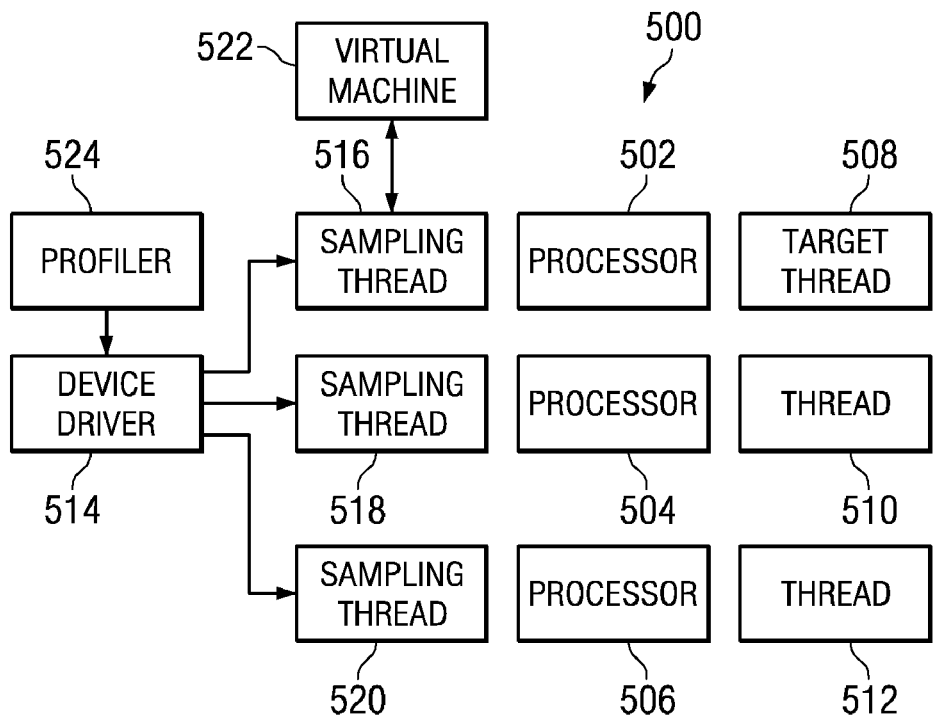
FIG. 5 is a diagram illustrating components used in obtaining call stack information in accordance with an illustrative embodiment.

Turning now to FIG. 5, a diagram illustrating components used in obtaining call stack information is depicted in accordance with an illustrative embodiment. In this example, data processing system 500 includes processors 502, 504, and 506. These processors are examples of processors that may be found in processor unit 200 in FIG. 2. During execution, each of these processors has threads executing on them in the depicted example. In other examples, one or more processors may be in an idle state in which no threads are executing on the processors in an idle state.

When an interrupt occurs, target thread 508 is executing on processor 502; thread 510 is executing on processor 504; and thread 512 is executing on processor 506. In these examples, target thread 508 is the thread interrupted on processor 502. For example, the execution of target thread 508 may be interrupted by a timer interrupt or hardware counter overflow, where the value of the counter is set to overflow after a specified number of events, for example, after 100,000 instructions are completed.

When an interrupt is generated, device driver 514 sends a signal to selected sampling thread in sampling threads 516, 518, and 520. Each of these sampling threads is associated with one of the processors. Sampling thread 518 is associated with processor 504, sampling thread 520 is associated with processor 506, and sampling thread 516 is associated with processor 502. One of these sampling threads is woken by device driver 514 when the sampling criteria is met. In these examples, device driver 514 is similar to device driver 206 in FIG. 2. In this example, target thread 508 is the thread of interest for which call stack information is desired.

In the illustrative examples, sampling thread 516 is assigned work in the form of determining whether a flag is set in a control block, setting a flag in a control block, and/or incrementing a counter in a control block. Sampling thread 516 determines whether a flag, such as flag 402 in FIG. 4, has been set for target thread 508.

If the flag has not been set, sampling 516 causes profiler 524 to set another flag in another control block accessed by virtual machine 522. If the flag has already been set, sampling thread 516 increments a counter in the control block. Further, sampling thread 516 also may store thread state information, such as thread state information 406 in FIG. 4 within the control block.

While target thread 508 is executing and when selected events, such as an entry into a method, an exit from a method or a backwards branch occurs, virtual machine 522 determines whether a flag is set for target thread 508. If a flag is set, virtual machine 522 calls profiler 524 to indicate that call stack sampling may occur. In response, profiler 524 makes a call to virtual machine 522 to obtain call stack information.

The call stack information may be obtained by making appropriate calls to virtual machine 522. In these examples, virtual machine 522 is a Java™ virtual machine. In these examples, the interface is a Java™ Virtual Machine Tools Interface (JVMTI). This interface allows for the collection of call stack information. The call stacks may be, for example, standard trees containing count usage for different threads or methods. The Java™ virtual machine tool interface is an interface that is available in Java™ 5 software development kit (SDK), version 1.5.0. The Java™ virtual machine profiling interface (JVMPI) is available in Java™ 2 platform, standard edition (J2SE) SDK version 1.4.2. These two interfaces allow processes or threads to obtain information from the Java™ virtual machine in the form of a tool interface to the Java™ virtual machine. Descriptions of these interfaces are available from Sun Microsystems, Inc.

Either interface or any other interface to a Java™ virtual machine may be used to obtain call stack information for one or more threads. Call stack information obtained by sampling thread 516 is provided to profiler 524 for processing.

A call tree is constructed from the call stack obtained from virtual machine 522 at the time of a sample. The call tree may be constructed by monitoring method/functions entries and exits. In these examples, however, tree 600 in FIG. 6 is generated using samples obtained by a sampling thread, such as sampling thread 516 in FIG. 5.

Figure 6:
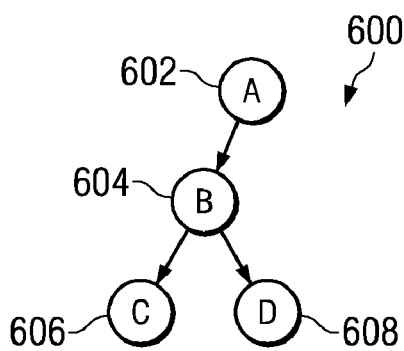
FIG. 6 is a diagram of a tree in accordance with an illustrative embodiment.

Turning to FIG. 6, a diagram of a tree is depicted in accordance with an illustrative embodiment. Tree 600 is a call tree and is an example of tree 250 in FIG. 2. Tree 600 is accessed and modified by an application, such as profiler 208 in FIG. 2. In this depicted example, tree 600 contains nodes 602, 604, 606, and 608. Node 602 represents an entry into method A, node 604 represents an entry into method B, and nodes 606 and 608 represent entries into method C and D respectively.

Figure 7:
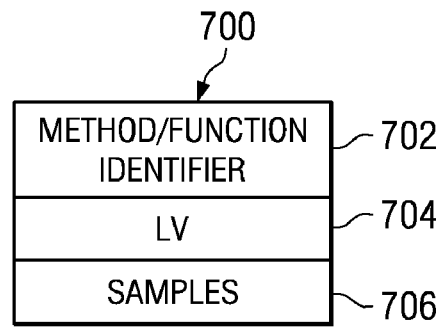
FIG. 7 is a diagram illustrating information in a node in accordance with an illustrative embodiment.

With reference now to FIG. 7, a diagram illustrating information in a node is depicted in accordance with an illustrative embodiment. Entry 700 is an example of information in a node, such as node 602 in FIG. 6. In this example, entry 700 contains method/function identifier 702, tree level (LV) 704, and samples 706. Samples 706 also may include counter information collected by the sampling thread. The value of the counter may be added to the count in samples 706 in the leaf node of the tree when a call stack is processed by the profiler.

The information within entry 700 is information that may be generated for a node within a tree. For example, method/function identifier 702 contains the name of the method or function. Tree level (LV) 704 identifies the tree level of the particular node within the tree. For example, with reference back to FIG. 6, if entry 700 is for node 602 in FIG. 6, tree level 604 would indicate that this node is a root node.

When the profiler is signaled, the profiler may request that a call stack be retrieved for each thread of interest. Each call stack that is retrieved is walked into a call stack tree and each sample or changes to metrics that are provided by the device driver are added to the leaf node's base metrics, which may be the count of samples of occurrences a specific call stack sequences. In other embodiments, the call stack sequences may simply be recorded.

Figure 8:
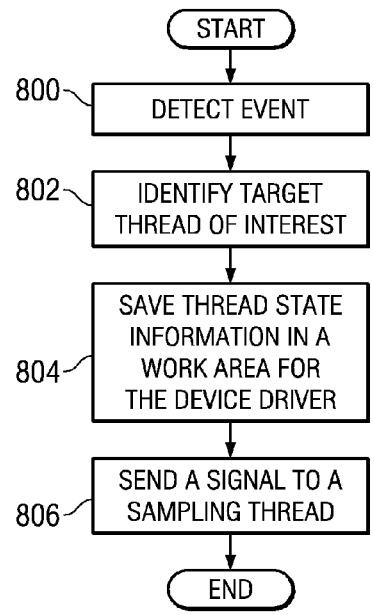
FIG. 8 is a flowchart of a process for initiating collection of call stack information for a target thread in accordance with an illustrative embodiment.

Turning now to FIG. 8, a flowchart of a process for initiating collection of call stack information for a target thread is depicted in accordance with an illustrative embodiment. The process illustrated in FIG. 8 may be implemented in a software component, such as device driver 514 in FIG. 5.

The process begins by detecting an event (step 800). In these examples, the event may be a call from an operating system or an interrupt. Next, a target thread is identified (step 802). In step 802, the target thread may be identified from the interrupt. For example, the interrupt may include identification of a thread that was executing when the interrupt occurred.

Thereafter, thread state information for the target thread is saved in a work area for the device driver (step 804). An example of the work area is device driver work area 214 in FIG. 2. Next, a signal is sent to a selected sampling thread (step 806) with the process terminating thereafter. The selected sampling thread may be identified in a number of different ways. For example, the selected sampling thread may be selected as the sampling thread associated with a processor in which the interrupted thread was executed. Of course, other mechanisms also may be used depending on the particular implementation.

Figure 9:
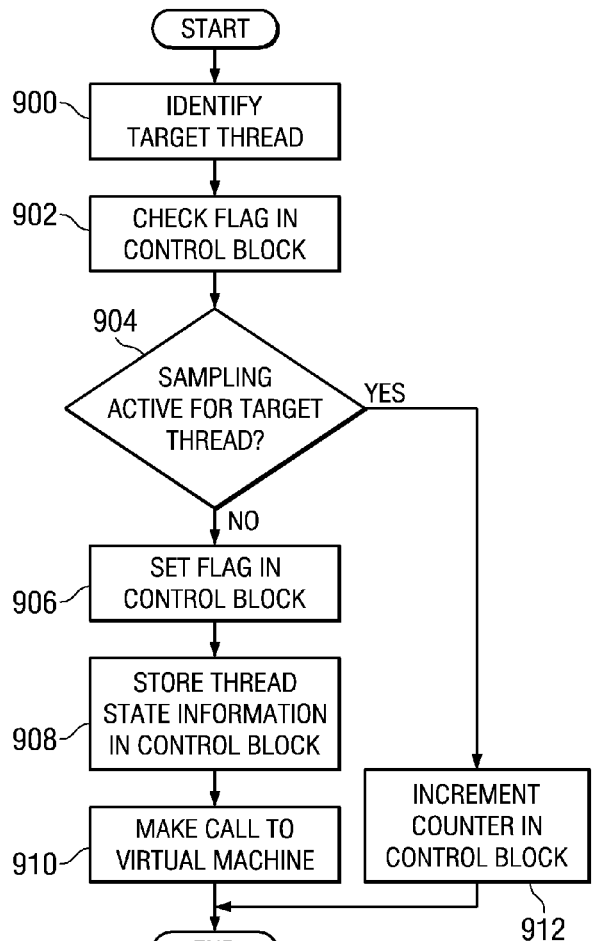
FIG. 9 is a flowchart of a process used by a sampling thread to collect call stack information in accordance with an illustrative embodiment.

With reference next to FIG. 9, a flowchart of a process used by a sampling thread to collect call stack information is depicted in accordance with an illustrative embodiment. The process illustrated in FIG. 9 may be implemented in a sampling thread, such as selected sampling thread 230 in FIG. 2.

The process begins by identifying a target thread (step 900). The identification of the target thread may be made using information received from the device driver. A flag in a control block associated with the target thread is checked (step 902). In step 902, the control block may be a control block, such as control block 400 in FIG. 4, which may be found in profiler work area 218 in FIG. 2.

Next, a determination is made as to whether sampling is active for the target thread (step 904). In these examples, the determination is made through the check of the flag in the control block in step 902. If the flag has not been set, then sampling is not active for the target thread. If the flag is set, then sampling is considered to be active for the target thread. In other words, a request has already been made to sample or obtain call stack information from the target thread that has not yet occurred. If sampling is not active for the target thread, a flag is set in the control block (step 906).

Next, the process stores thread state information in the control block (step 908). This thread state information may be obtained from a device driver work area, such as device driver work area 214 in FIG. 2.

The process then makes a call to the virtual machine (step 910) with the process terminating thereafter. This call is made to set a flag in the virtual machine to request a call back when sampling of call state information for the target thread may occur. In these examples, the call is made by the profiler associated with the sampling thread.

With reference again to step 904, if sampling for the target thread is active, then a counter is incremented in the control block associated for the target thread (step 912). The process terminates thereafter.

Depending on the particular implementation, the counter also may be used as a flag to determine whether sampling is active. If the value for the counter is zero, then no sampling is active, while any other value indicates that sampling is active for the target thread.

Figure 10:
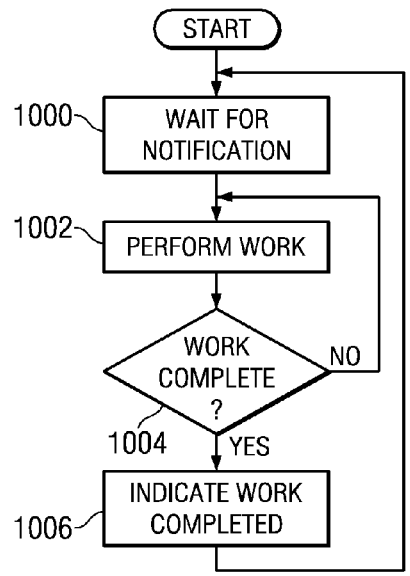
FIG. 10 is a flowchart of a process for a sampling thread in accordance with an illustrative embodiment.

Turning now to FIG. 10, a flowchart of a process for a sampling thread is depicted in accordance with an illustrative embodiment. The process illustrated in FIG. 10 may be implemented in a sampling thread, such as selected sampling thread 230 in FIG. 2.

The process begins by waiting for a notification (step 1000). In this example, the notification may be a signal, such as signal 228 sent by device driver 206 in FIG. 2. The work is then performed (step 1002). In these examples, the work may be check a flag, increment a counter, and/or store state information in a control block associated with a target thread.

Next, a determination is made as to whether the work is complete (step 1004). If the work is not complete, the process returns to step 1002. Otherwise, an indication that the work is completed is made (step 1006). The process then returns to step 1000 to wait for another notification.

Figure 11:
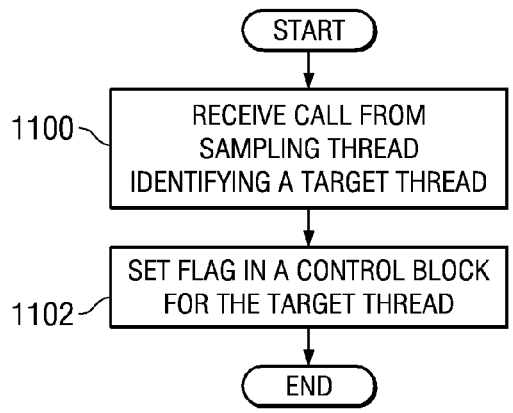
FIG. 11 is a flowchart of a process for setting a flag for a call out in accordance with an illustrative embodiment.

Turning now to FIG. 11, a flowchart of a process for setting a flag for a call out is depicted in accordance with an illustrative embodiment. The process illustrated in FIG. 11 may be implemented in a virtual machine, such as virtual machine 204 in FIG. 2.

The process begins by receiving a call from a sampling thread identifying a target thread (step 1100). Thereafter, the process sets a flag in a control block for the target thread (step 1102) with the process terminating thereafter. In step 1102, the flag may be flag 302 within control block 300 in FIG. 3. This control block may be found in virtual machine work area 216 in FIG. 2. The flag set in the control block in step 1102 is used by the virtual machine to determine when to make a call out to the profiler when selected events occur.

Figure 12:
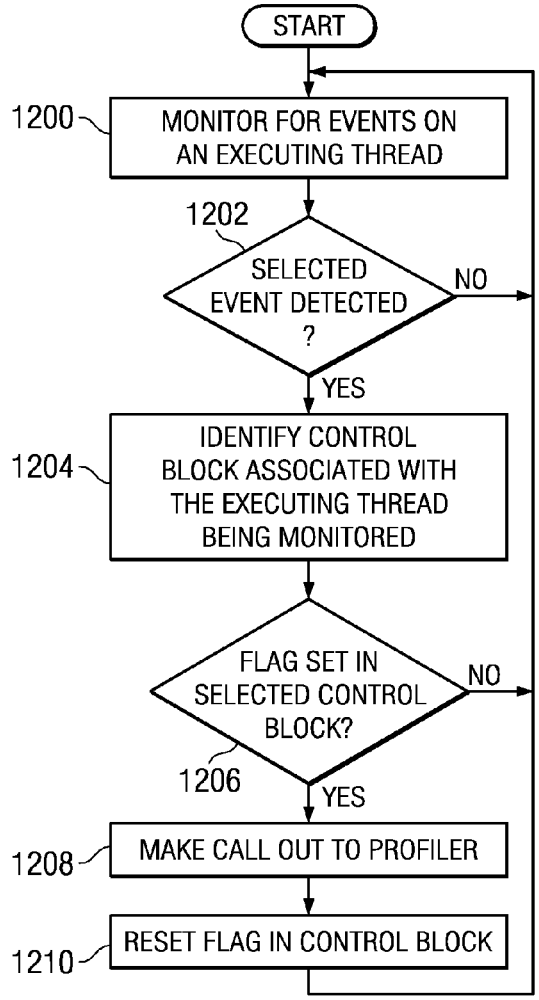
FIG. 12 is a flowchart of a process for generating call outs in accordance with an illustrative embodiment.

With reference next to FIG. 12, a flowchart of a process for generating call outs is depicted in accordance with an illustrative embodiment. The process illustrated in FIG. 12 may be implemented in a virtual machine, such as virtual machine 204 in FIG. 2.

The process begins by monitoring for events on an executing thread (step 1200). A determination is made as to whether a selected event has been detected (step 1202). In these examples, the selected event is an entry into a method, an exit from a method, or a backward branch for a method. Of course, in other embodiments, other events also may be used in addition to these or in place of these as selected events. The particular events selected may vary in different implementations.

If a selected event is detected, the process identifies the control block associated with the executing thread being monitored in a work area for the virtual machine (step 1204). In these examples, the control block is control blocks 242 in virtual machine work area 216 in FIG. 2. A determination is then made as to whether a flag is set in the selected control block (step 1206). If a flag is not set, the process returns to step 1200. Otherwise, a call out is made to the profiler (step 1208). The call out in step 1208 may be, for example, call out 244 in FIG. 2. This call out is a signal that indicates to the profiler that a collection of call stack information may occur at this time. The call out indicating that call stack information may be obtained from a virtual machine is received by the profiler when target threads are executing. In the case of entry or exit events, the call stack is retrieved before the entry or exit occurs, in these examples, so that the correct call stack information be retrieved.

The process then resets the flag in the control block (step 1210) and returns to step 1200 as described above. With reference again to step 1202, if a selected event is not detected, the process returns to step 1200 as described above.

Figure 13:
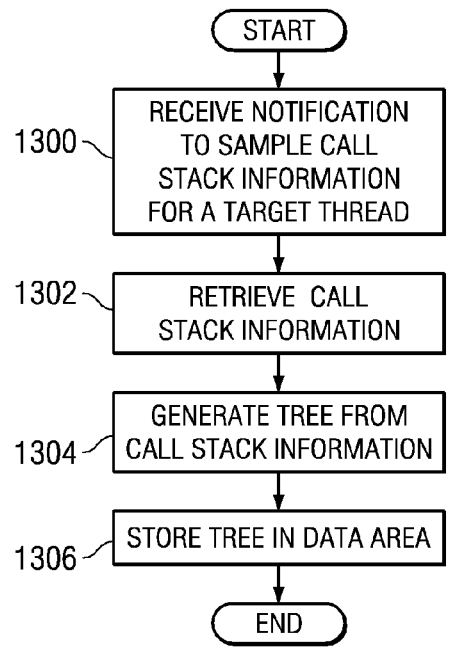
FIG. 13 is a flowchart of a process in a virtual machine for collecting call stack information in accordance with an illustrative embodiment.

Turning next to FIG. 13, a flowchart of a process in a virtual machine for collecting call stack information is depicted in accordance with an illustrative embodiment. The process illustrated in FIG. 13 may be implemented in a virtual machine, such as virtual machine 204 in FIG. 2.

The process begins by receiving a notification to sample call stack information for a target thread (step 1300). Call stack information is then retrieved (step 1302). Next, a tree is generated from the call stack information (step 1304). Tree 600 in FIG. 6 is an example of a tree that may be generated by the sampling thread. Finally, the tree is stored in a data area (step 1306) with the process terminating thereafter. In these examples, the tree is stored in a data area, such as data area 252 in FIG. 2.

Figure 14:
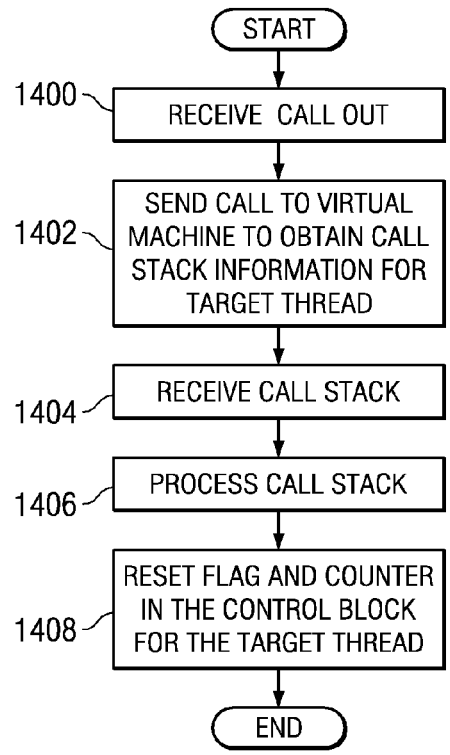
FIG. 14 is a flowchart of a process for processing a call out in a profiler in accordance with an illustrative embodiment.

With reference now to FIG. 14 a flowchart of a process for processing a call out in a profiler is depicted in accordance with an illustrative embodiment. The process illustrated in FIG. 14 may be implemented in a profiler, such as profiler 208 in FIG. 2.

The process begins by receiving a call out (step 1400). This call out is a call out, such as call out 244 in FIG. 2, received from the virtual machine in these examples. The call out indicates that the virtual machine is ready to obtain call stack information for target threads. The process then sends a call to the virtual machine to obtain call stack information for the target thread (step 1402). The call stack is received (step 1404).

The profiler then processes the call stack (step 1406). The process resets the flag and counter in the control block for the target thread (step 1408) with the process terminating thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Thus, the illustrative embodiments provide a computer implemented method, apparatus, and computer usable program code for sampling call stack information. A flag associated with a target thread in a memory work area associated with a virtual machine is set in response to an interrupt. Monitoring is performed for an event during execution of a plurality of threads created by the virtual machine. In response to detecting an occurrence of the event, a determination is made as to whether the flag is set. If the flag is set, a call out is made to a profiler to initiate sampling of the call stack information.

With some or all of the different illustrative embodiments, an amount of overhead needed to obtain call stack information is reduced. As one non-limiting example, using flags to indicate when sampling is active for a thread, the setting or resetting of a flag does not occur repeatedly when each interrupt for the same target thread is generated. The virtual machine indicates when the virtual machine is ready to sample call stack information. During this time, a flag may be set only once for a particular target thread. As a result, the execution of additional instructions as well as the overhead associated with this process is avoided. By reducing the number of times a call or flag is set, overhead associated with monitoring or profiling the execution of code may be reduced.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for sampling call stack information, the computer implemented method comprising:
   responsive to an interrupt, setting a first flag associated with a target thread in a first memory work area associated with a virtual machine and determining whether a second flag associated with the target thread in a second memory work area associated with a profiler is set, wherein the target thread is one of a plurality of threads created by the virtual machine, and wherein the second flag being set indicates whether the sampling is currently active for the target thread;
   responsive to a determination that the second flag is set, incrementing a counter for the target thread in the second memory work area, wherein the counter identifies a number of times that a sampling thread has been signaled to sample the target thread while the sampling of the call stack information for the target thread was active;
   responsive to a determination that the second flag is unset, setting the second flag;
   monitoring for an event corresponding to the target thread during execution of the plurality of threads created by the virtual machine;
   responsive to an occurrence of the event, determining whether the first flag is set; and
   responsive to the first flag being set, sending a request to the profiler to sample call stack information for the target thread, wherein the profiler obtains call stack information for the target thread from the virtual machine, and processes the call stack information for the target thread to generate a report of performance information for the target thread.

2. The computer implemented method of claim 1, wherein the second flag is the counter and wherein the second flag is unset when the counter has a value of zero.

3. The computer implemented method of claim 1 further comprising:
   responsive to the profiler receiving the request, sending a call to the virtual machine to obtain the call stack information.

4. The computer implemented method of claim 1 further comprising:
   saving thread state information for the target thread into a control block associated with the target thread.

5. The computer implemented method of claim 1, wherein the second flag and the counter are stored in a control block associated with the target thread in the second memory work area.

6. The computer implemented method of claim 1, wherein the event is selected from one of an entry into a method, an exit from the method, and a backwards branch.

7. The computer implemented method of claim 1, wherein the event is a counter overflow interrupt.

8. A computer program product for sampling call stack information, the computer program product comprising:
   a non-transitory computer readable medium;
   program code, stored on the non-transitory computer readable medium, responsive to an interrupt, for setting a first flag associated with a target thread in a first memory work area associated with a virtual machine and determining whether a second flag associated with the target thread in a second memory work area associated with a profiler is set, wherein the target thread is one of a plurality of threads created by the virtual machine, and wherein the second flag being set indicates whether the sampling is currently active for the target thread;
   program code, stored on the non-transitory computer readable medium, responsive to a determination that the second flag is set, for incrementing a counter for the target thread in the second memory work area, wherein the counter identifies a number of times that a sampling thread has been signaled to sample the target thread while the sampling of the call stack information for the target thread was active;
   program code, stored on the non-transitory computer readable medium, responsive to a determination that the second flag is unset, for setting the second flag;
   program code, stored on the non-transitory computer readable medium, for monitoring for an event corresponding to the target thread during execution of the plurality of threads created by the virtual machine;
   program code, stored on the non-transitory computer readable medium, responsive to an occurrence of the event, for determining whether the first flag is set; and
   program code, stored on the non-transitory computer readable medium, responsive to the first flag being set, for sending a request to the profiler to sample call stack information for the target thread, wherein the profiler obtains call stack information for the target thread from the virtual machine, and processes the call stack information for the target thread to generate a report of performance information for the target thread.

9. The computer program product of claim 8, wherein the second flag is the counter and wherein the second flag is unset when the counter has a value of zero.

10. The computer program product of claim 8 further comprising:
    program code, stored on the non-transitory computer readable medium, responsive to the profiler receiving the request, for sending a call to the virtual machine to obtain the call stack information.

11. The computer program product of claim 8 further comprising:
    program code, stored on the non-transitory computer readable medium, for saving thread state information for the target thread into a control block associated with the target thread.

12. The computer program product of claim 8, wherein the second flag and the counter are stored in a control block associated with the target thread in the second memory work area.

13. The computer program product of claim 8, wherein the event is selected from one of an entry into a method, an exit from the method, and a backwards branch.

14. A data processing system comprising:
    a bus;
    a communications unit connected to the bus;
    a storage device connected to the bus, wherein the storage device includes computer usable program code; and a processor unit connected to the bus; wherein the processor unit executes the computer usable program to:

set a first flag associated with a target thread in a first memory work area associated with a virtual machine and determine whether a second flag associated with the target thread in a second memory work area associated with a profiler is set in response to an interrupt, wherein the target thread is one of a plurality of threads created by the virtual machine, and wherein the second flag being set indicates whether the sampling is currently active for the target thread;

increment a counter for the target thread in the second memory work area in response to a determination that the second flag is set, wherein the counter identifies a number of times that a sampling thread has been signaled to sample the target thread while the sampling of the call stack information for the target thread was active;

set the second flag in response to a determination that the second flag is unset;

monitor for an event corresponding to the target thread during execution of the plurality of threads created by the virtual machine;

determine whether the first flag is set in response to an occurrence of the event; and send a request to a profiler to sample call stack information for the target thread in response to the first flag being set, wherein the profiler obtains call stack information for the target thread from the virtual machine, and processes the call stack information for the target thread to generate a report of performance information for the target thread.

15. The data processing system of claim 14, wherein the second flag is the counter and wherein the second flag is unset when the counter has a value of zero.

16. The data processing system of claim 14 wherein the processor unit further executes the computer usable program code to send a call to the virtual machine to obtain the call stack information in response to the profiler receiving the request.

17. The data processing system of claim 14 wherein the processor unit further executes the computer usable program code to save thread state information for the target thread into a control block associated with the target thread.

* * * * *